United States Patent [19]

Smith

[11] Patent Number: 4,795,222
[45] Date of Patent: Jan. 3, 1989

[54] METAL FACED SOFT TRACKS

[75] Inventor: Francis L. Smith, Calgary, Canada

[73] Assignee: Central Mine Equipment Company, St. Louis, Mo.

[21] Appl. No.: 53,954

[22] Filed: May 26, 1987

[51] Int. Cl.$^4$ ........................ B62D 55/28; B62D 55/24
[52] U.S. Cl. .................................. 305/35 EB; 305/39; 305/54
[58] Field of Search ................. 305/35 R, 35 EB, 38, 305/39, 37, 54, 57

[56] References Cited

U.S. PATENT DOCUMENTS

| | | | |
|---|---|---|---|
| 3,165,364 | 1/1965 | Hardman et al. | 305/54 X |
| 3,703,321 | 11/1972 | Schoonover | 305/54 X |
| 4,278,302 | 7/1981 | Westimayer et al. | 305/54 X |
| 4,351,380 | 9/1982 | Pilliod, Jr. et al. | 305/54 X |
| 4,687,261 | 8/1987 | Atkin | 305/54 X |

FOREIGN PATENT DOCUMENTS 1085780 7/1960 Fed. Rep. of Germany ... 305/35 EB

*Primary Examiner*—Robert B. Reeves
*Assistant Examiner*—Russell D. Stormer
*Attorney, Agent, or Firm*—Polster, Polster and Lucchesi

[57] ABSTRACT

A soft track or off-road vehicle, with two loops of belting spaced laterally and joining and joined by grouser bars mounted on the outer surface of the loops, extending parallel to one another laterally across the loops and spaced from one another in a direction lengthwise of the loops is provided with facing plates mounted on the outer surface between the grouser bars but spaced from the grouser bars and extending laterally across the loops. Preferably, the facing plates are relatively thin as compared with the grouser bars, are shallowly arcuate in transverse section, with their convex side facing the loop, and formed with a lip extending over and along one side edge of a loop.

6 Claims, 1 Drawing Sheet

U.S. Patent
Jan. 3, 1989
4,795,222
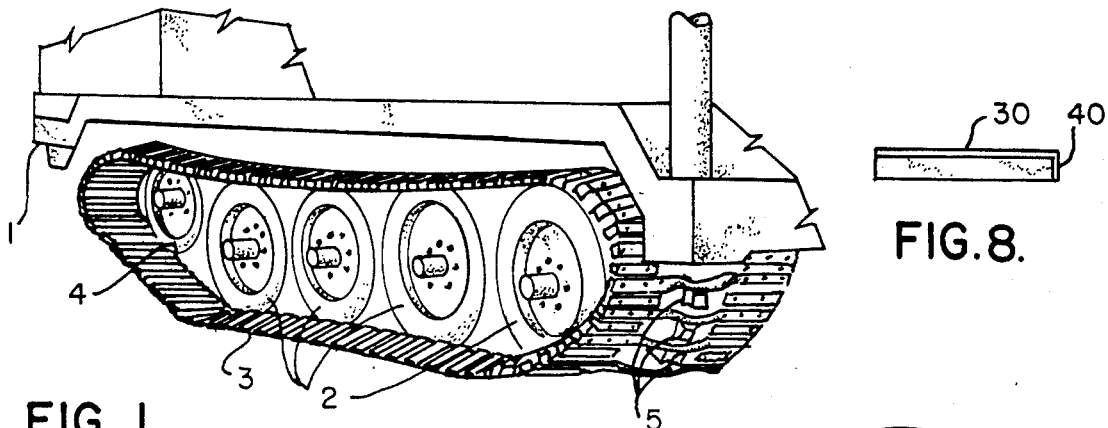
FIG. 1.
FIG. 8.
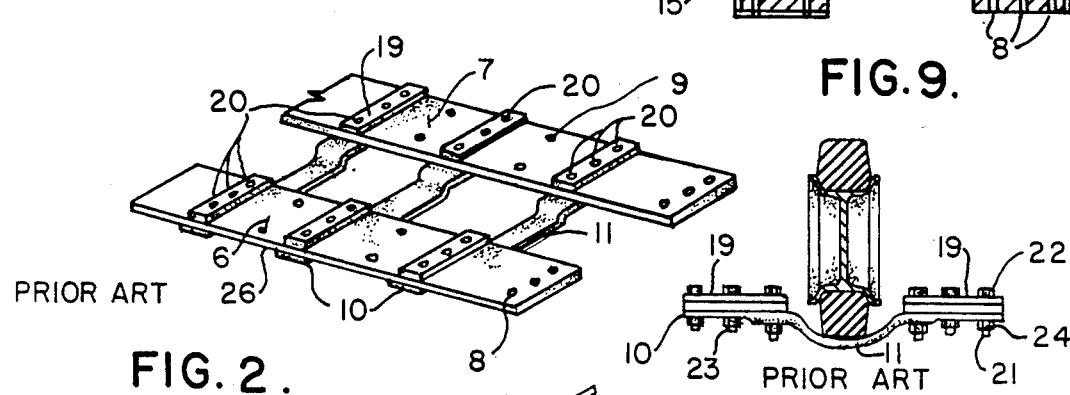
PRIOR ART
FIG. 2.
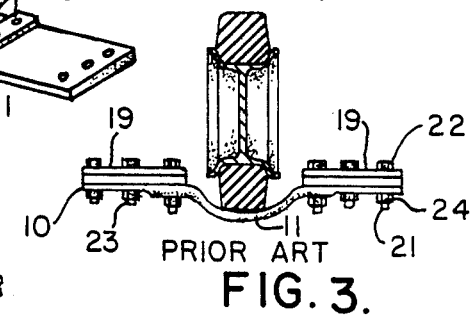
FIG. 9.
PRIOR ART
FIG. 3.
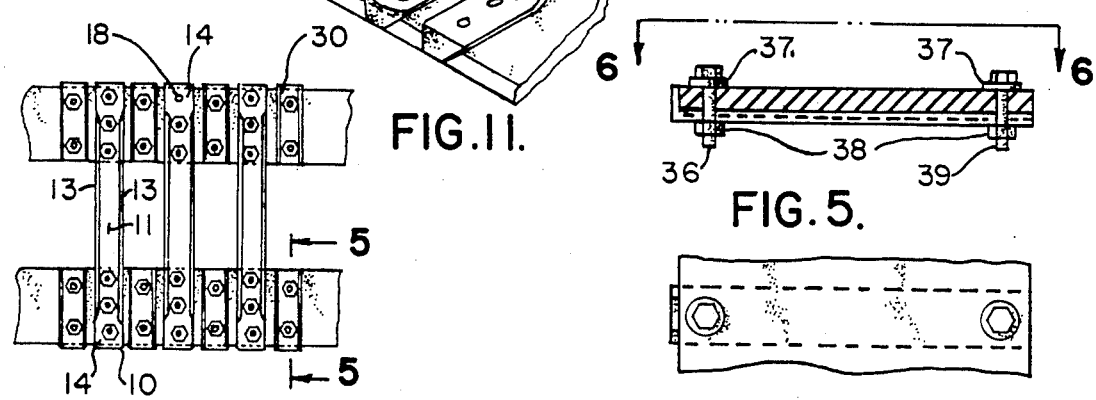
FIG. 11.
FIG. 4.
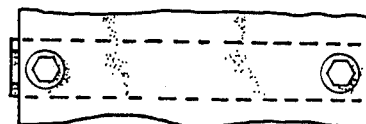
FIG. 5.
FIG. 6.
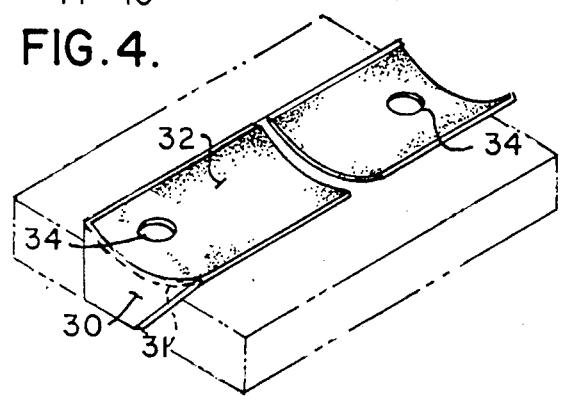
FIG. 7.
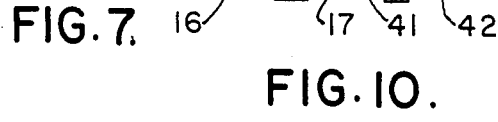
FIG. 10.

METAL FACED SOFT TRACKS

BACKGROUND OF THE INVENTION

The conventional tracks used in many off-road vehicles are commonly known as soft tracks. They differ from the steel tracks used on bulldozers and the like in utilizing two laterally spaced loops of rubber and fabric belting connecting and being connected by steel grouser bars, to form a continuous track. This construction leaves a clear span, commonly a drop center or D-dent configuration, that forms a path for guidance of the vehicle load carrying bogie wheels. Other forms of track known as flat or tundra tracks are similarly constructed, differing only in the provision of an "inside" bridging bar to provide a guiding path for the vehicle load carrying wheels. The center span of the grouser bars or bridging bars also serves to engage and be engaged by a drive sprocket. To this end, they are spaced a substantial distance apart, on the order of three to four inches. This has been standard construction for at least 25 years. It leaves the belt surface between the grouser bars unprotected from damage from sharp edged rocks and slash timber and tree stumps or the like. When such damage occurs, commonly the damaged part is cut out and a new section spliced into the belt, or else the entire belt is replaced. Repairing or replacing the belt is expensive not only in parts and labor, but in the down time of the machine.

One of the objects of this invention is to provide a soft track construction in which the belting is protected from damage.

Another object is to provide such a soft track at a cost that is more than justified by the reduction in maintenance required.

Other objects will become apparent to those skilled in the art in the light of the following description and accompanying drawing.

SUMMARY OF THE INVENTION

In accordance with this invention, generally stated, in a soft track for off-road vehicles, the track having two, continuous loops of belting spaced laterally and joined by grouser bars mounted on the outer surface of the loops, the grouser bars extending parallel to one another laterally across the loops and being spaced from one another in a direction lengthwise of the loops, facing plates are provided, mounted on the outer surface of the loops between the grouser bars but spaced narrowly from the grouser bars and extending laterally across the loops. Preferably, the facing plates are shallowly arcuate in their transverse direction, and are mounted with their convex sides facing the loop. Further in the preferred embodiment, the facing plates are formed with lips extending over and along one side edge of a loop. In the latter embodiment, the grouser bars may also be provided with lips extending over and along the outboard edge over which the facing plate lips extend, and the side edges of adjacent lips extend outwardly divergently, i.e., the side edges of the lips of each grouser bar and of each facing plate extend in a direction convergently to one another, and therefore divergently from their immediate neighbors. The facing plates can be provided with a lip to extend over the outer edge of the belt. As will be explained hereinafter, the backing plates of the grouser bars serve to protect the edge surfaces of the belting loops.

BRIEF DESCRIPTION OF THE DRAWINGS

In the drawings, FIG. 1 is a fragmentary view in perspective of a vehicle equipped with a soft track of one embodiment of this invention;

FIG. 2 is a view in perspective showing a coventional soft track but with holes in belting loops to accomodate facing plates of this invention;

FIG. 3 is a sectional view of a conventional soft track;

FIG. 4 is a fragmentary top plan view of a soft track of this invention;

FIG. 5 is a sectional view of one embodiment of facing plate of this invention;

FIG. 6 is a fragmentary bottom plan view of one belt loop, taken along the line 6—6 of FIG. 5;

FIG. 7 is a view in perspective, partly broken away and partly in phantom lines showing the under side of a facing plate on a belting loop;

FIG. 8 is a view partly in section showing a facing plate with one lip;

FIG. 9 is a sectional view showing a grouser bar with lips;

FIG. 10 is a view in side elevation; and

FIG. 11 is a fragmentary detail view in perspective showing a facing plate and a part of a grouser bar on a belt.

DESCRIPTION OF THE PREFERRED EMBODIMENT

Referring now to the drawings for one illustrative embodiment of this invention, reference numeral 1 indicates a vehicle, such as a drilling rig, mounted to be supported on rubber tired road wheels or bogie wheels 2. A soft track 3 runs beneath the bogie wheels 2, around a track tensioning idler 4, around a drive sprocket 5 and beneath the bogie wheels 2 in a continuous spliced loop.

The soft track 3 on both sides of the vehicle is made up of an outer belting loop 6 and an inner belting loop 7, joined by and joining grouser bars 10. The grouser bars 10 extend laterally across the loops 6 and 7, parallel with one another, and spaced uniformly longitudinally of the loops 6 and 7. Between the loops 6 and 7 the grouser bars in this embodiment are shown as having a drop center or D-dent 11, arched outwardly with respect to the bogie wheels and idler wheel. Flanges 13 on the long edges of the grouser bars through the D-dent section 11 serve the double function of reinforcement and traction. The grouser bars end, at either outside end, in a flat blade part 14 which, in this embodiment, is shown as having a lip 15 extending over and along an outer side edge of belt loop 6. The lip 15 has side edges 16 and 17 that tend convergently outwardly. The flat blade part 14 has holes 18 through it, centered in the direction from side to side and spaced in the lengthwise direction.

On the opposite, inner broad surface of the belting loops 6 and 7, aligned with the flat blade parts of the grouser bars, are backing plates 19. The backing plates 19 extend all the way across each of the belting loops, and stop at the edges of the respective loops. The backing plates 19 have holes 20 aligned with the holes 18 in the grouser bars, and with holes 8 in the belting loops. The holes 8 are pre-formed, and determine the location of the grouser bars. Bolts 21, each with a head 22 and a shank 23 threaded at its outer end, extend through the holes in the backing plate, belting loop and grouser bars, with the head 22 on the inner, backing plate side of the belting loop and threaded shank projecting outwardly. Nuts 24 are threaded on the shanks 23. As will be appreciated, the threads will almost immediately be spoiled when the vehicle is used, thus precluding unscrewing of the nuts.

All of the elements thus far described have been conventional, except for the lips 15.

In the track of this invention, facing plates 30 are mounted between the grouser bars 10. In the preferred embodiment shown, each facing plate has a broad concave upper surface 32 and a broad convex lower surface 31, the latter contiguous the upper surface of the belting loops. Each of the facing plates 30 has in it two holes 34, aligned with holes 9 in the belting loops, through which bolts 36 extend in the same manner in which the bolts 21 extend through the holes 20 and 18 of the backing plate and grouser bar. In the case of the facing plates 30, the bolts extend through and the heads of the bolts bear against large washers 37. Whereas the backing plates 19 carry the force exerted by the sprocket and transmitted to the belting loops, the washers 37 take substantially no force, and need only be of sufficient diameter to spread the bolt clamping load over the belt. The holes 9 are preferably staggered with respect to the holes 8 in the belt.

Although the facing plates are preferrably made from heat treated steel, and are sized in thickness to withstand bending loads imposed by rocks or other debris, they are, nevertheless, substantially thinner than the grouser bars. They are sufficiently wide to cover as much of the otherwise exposed belt surface between the grouser bars as possible, leaving just sufficient space between them and the adjacent grouser bars so that the track retains enough flexibility to accommodate ground and object induced undulation, and to permit the belt to traverse the idler wheel and sprocket reaches.

In the preferred embodiment, each facing plate is provided, at its outer end, with a lip 40, side edges 41 and 42 of which tend convergently outwardly with respect to one another. As in the case of the lips 15 of the grouser bars, the lips 40 extend over and along the outer edges of the belting loops 6 and 7. It can be seen that adjacent side edges of lips 40 and 15 tend divergently outwardly with respect to one another, providing the necessary clearance to accommodate the turning of the belts around the idler wheel and drive sprocket.

All of the lips may be dispensed with as a means of cost reducing. If only one set of lips is to be provided, it should be on the facing plates, rather than on the grouser bars. The fact that both the flat blade part 14 of the grouser bars and the backing plates 19 extend to both edges of both of the belting loops provides protection to and reinforcement of the belt substantially to its outer edges. There is no protection in the conventional belt intermediate the grouser bars.

Numerous variations in the construction of the soft track of this invention, within the scope of the appended claims, will occur to those skilled in the art in the light of the foregoing disclosure. The cross sectional configuration of the facing plates can be varied, from flat to ribbed or flanged. The grouser bar backing plates can be provided with a lip, although this has the distinct disadvantage of inviting packing of the space between the lip and the side edge of the belt with debris. Other means for mounting the facing plates can be provided, particularly because, in the preferred embodiment the facing plates are substantially thinner than the grouser bars, so that the facing plates are to some extent protected from abrasion, by the grouser bars. These variations are merely illustrative.

Having thus described the invention, what is claimed and desired to be secured by Letters Patent is:

1. In a soft track for off-the-road vehicles, said track having two loops of belting spaced laterally and joined by grouser bars mounted on an outer surface of said loops, extending parallel to one another laterally across said belting loops and spaced from one another in a direction lengthwise of said belting loops, said track being driven by and extending around a drive sprocket, the improvement comprising heat treated steel facing plates mounted on each belting loop on said outer surface between said grouser bars and spaced in the direction lengthwise of said belting loop from said grouser bars only sufficiently to accommodate ground and object induced undulation and to permit the track to traverse said drive sprocket, and extending laterally across said belting loop.

2. The improvement of claim 1 wherein said facing plates are thinner than said grouser bars.

3. The improvement of claim 1 wherein the facing plates are shallowly arcuate in their transverse direction, with their convex side facing said loop.

4. The improvement of claim 1 wherein said facing plates are formed with lips extending over and along the outboard edge of said loop and said grouser bars are formed with lips extending over and along said outboard edge.

5. The improvement of claim 4 wherein side edges of the said grouser bar lips and facing plate lips are formed to project in a direction convergently outwardly.

6. The improvement of claim 1 wherein the grouser bars are arched outwardly between the belts and are engaged by the drive sprocket solely within the span between the belts.

* * * * *